US00RE35511E

United States Patent [19]

Nakamura

[11] E Patent Number: Re. 35,511

[45] Reissued Date of Patent: May 20, 1997

[54] ACCESSORY FOR EARRING

[76] Inventor: Azuko Nakamura, 816-70 3-Chome, Mukouhara, Higashiyamato-shi, Tokyo-to, Japan

[21] Appl. No.: 405,380

[22] Filed: Mar. 15, 1995

Related U.S. Patent Documents

Reissue of:

[64] Patent No.: 5,097,682
Issued: Mar. 24, 1992
Appl. No.: 629,153
Filed: Dec. 18, 1990

U.S. Applications:

[63] Continuation of Ser. No. 210,348, Mar. 18, 1994, abandoned.

[51] Int. Cl.[6] ..... A44C 7/00

[52] U.S. Cl. ..... 63/14.1; 63/12

[58] Field of Search ..... 63/14.1, 14.2, 63/14.3, 14.8, 12, 1.1, 29.1, 23

[56] References Cited

U.S. PATENT DOCUMENTS

| | | | |
|---|---|---|---|
| 20,480 | 6/1858 | Carpenter | 63/14.2 |
| 89,452 | 4/1869 | Weed | 63/14.2 |
| 130,771 | 8/1872 | Tryner | 63/14.2 |
| 1,852,130 | 4/1932 | Schier | 63/14.1 |
| 1,953,437 | 4/1934 | Schier | 63/14.1 |
| 2,040,083 | 5/1936 | Elliott et al. | 63/14.2 |
| 2,410,914 | 11/1946 | Williams | 63/14.2 |
| 2,414,382 | 1/1947 | McCann | 63/14.2 |
| 2,823,525 | 2/1958 | Grigler | 63/14.1 |
| 4,727,883 | 3/1988 | Moody | 63/29.1 |

FOREIGN PATENT DOCUMENTS

| | | | |
|---|---|---|---|
| 2299829 | 9/1976 | France | 63/14.1 |
| 960133 | 3/1957 | Germany | 63/14.1 |
| 2808353 | 10/1978 | Germany | 63/14 R |

*Primary Examiner*—Kenneth J. Dorner
*Assistant Examiner*—Jerry Redman
*Attorney, Agent, or Firm*—Barry R. Lipsitz

[57] ABSTRACT

An earring is provided, that is simple to wear and is designed to minimize potential loss of the earring by inadvertent falling off. The earring is also designed to minimize pain to the earlobe of the wearer, even when the accessory that forms a portion of the earring becomes quite large. The earring of the invention includes a body portion adapted to be inserted into the external opening of a human ear; a connector for affixing an ornamental accessory to the earring, which is attached at an upper end to the main body portion; a hook-like element attached to the lower end of the connector, adapted to be releasably clamped to the rear side of the ear; and an accessory mounted at an ornamental location on the connector.

15 Claims, 5 Drawing Sheets

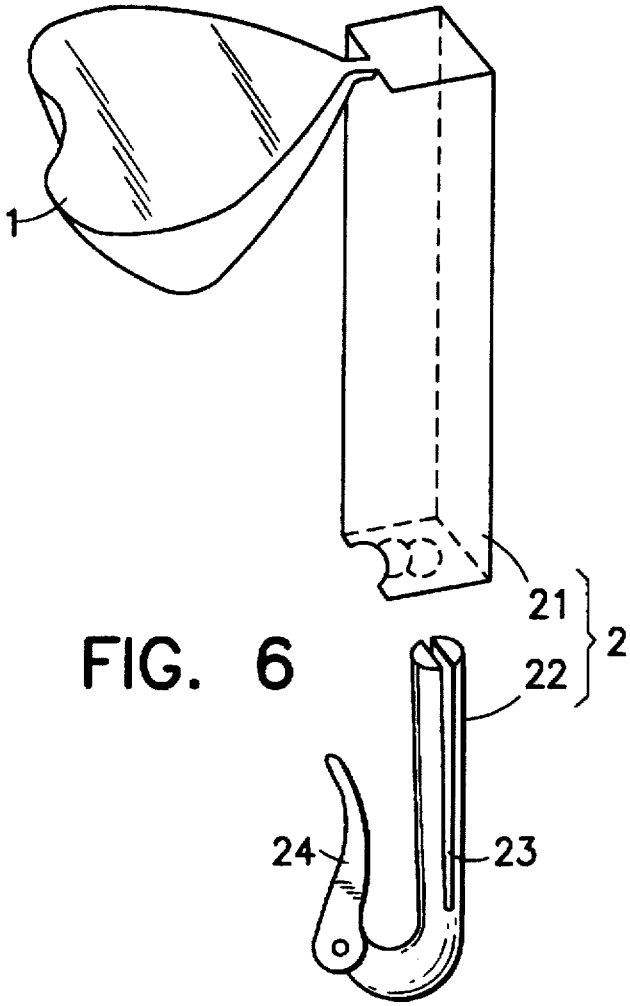
FIG. 6
FIG. 7
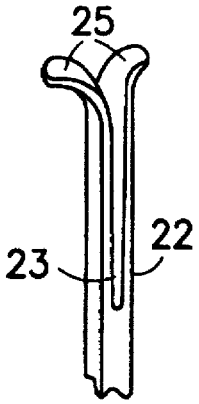
FIG. 8
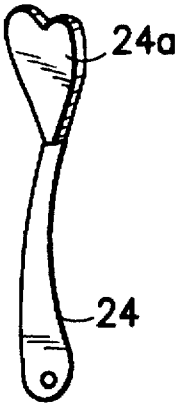

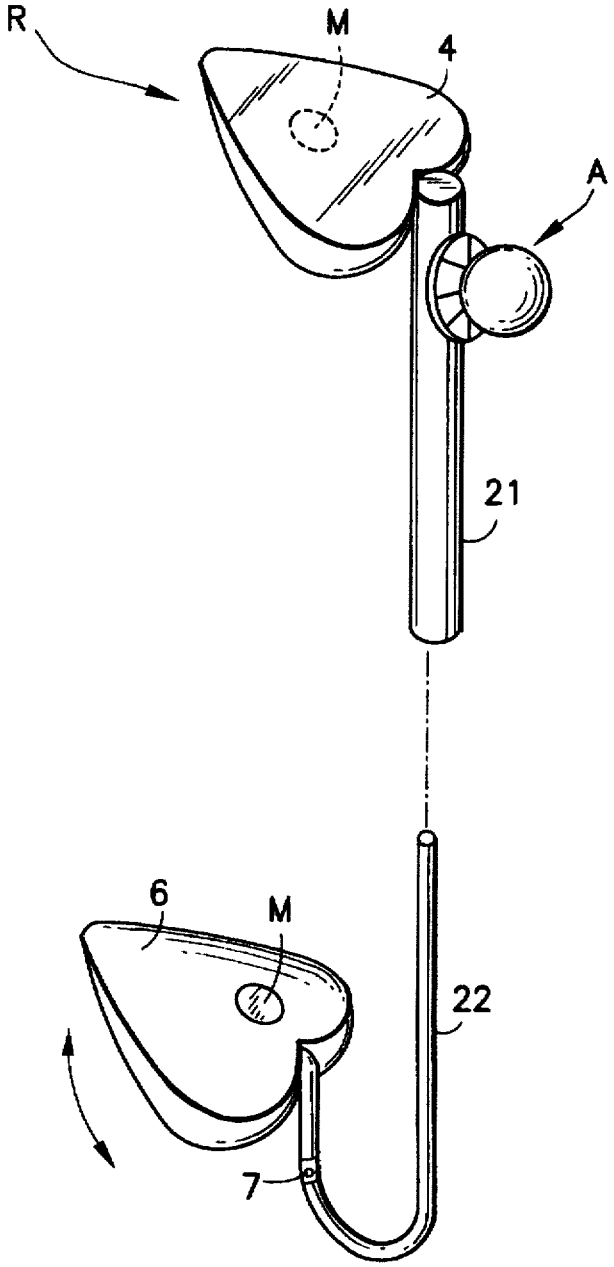
FIG. 9
FIG. 10
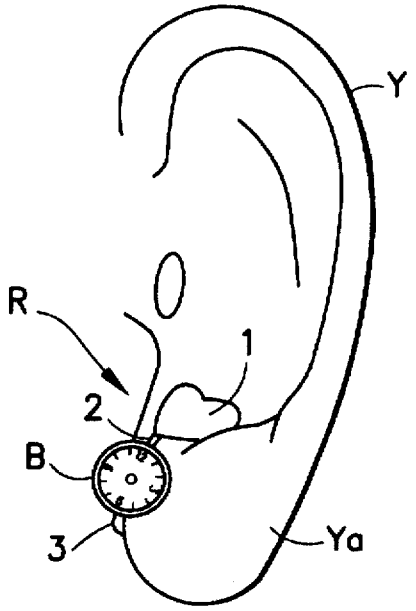

ACCESSORY FOR EARRING

Matter enclosed in heavy brackets [ ] appears in the original patent but forms no part of this reissue specification; matter printed in italics indicates the additions made by reissue.

*This application is a continuation of copending U.S. reissue patent application Ser. No. 08/210,348 filed Mar. 18, 1994, now abandoned, which was a reissue of U.S. Pat. No. 5,097,682.*

BACKGROUND OF THE INVENTION

1. Technical Field

The present invention relates to an earring system, and more particularly, to a novel accessory capable of wearing suitably [to] *at the* lower end portion of *an* earlobe from *the* opening end of *an* external ear of *a* human *being*.

2. Prior Art and Its Problem

[Earring is] *Earrings are* known from [old days for] *way back as* an accessory for wearing [to ear of human] *on the earlobe*.

Wearing method of this earring is [to hold] *accomplished* by clamping the earlobe from both sides of front and rear of it.

And, clamping system by screw or elastic material and the like is usual for the holding method thereof.

However, such conventional earring includes *the* following defects.

(a) Because of system for clamping the earlobe, pressing feeling is increased by elasping of wearing time period, and said pressing feeling may be changed to painful feeling progressively in accordance with the weight or shape of the accessory means. Accordingly, the using accessory means is limited to extremely light weighted material and selective range in designing is also extremely limited.

(b) Because the wearing to the earlobe is screwing manner or spring manner as previously mentioned, not only the wearing is annoying, and when pressure to hold to the earlobe is increased, but also pain or the like is arisen at the earlobe, while the pressure to hold to the earlobe is decreased, accident dropping from ear is likely to happen even by slight body action. Therefore, in *a* case when expensive jewelry and the like is employed for the [earing, there is inconvenience to] *earring, one must* be careful always.

Therefore, application of [earing has] *the prior art earring is* rather [difficulty] *difficult* for a person who likes genuine [article] *articles* or for a person who is in an age [of] *where it is* unnatural [for wearing] *to wear* an imitation.

(c) Clamping means such as screwing manner or spring manner is required for holding to the earlobe, but miniaturizing of this part is difficult and hence limitation in designing as a whole becomes greater.

Piercing to earlobe has been proposed against such disadvantage of the earring, however since it takes a structure that holding pin is directly penetrated through the earlobe whereby accessory is held as well known, (a) Accident such as dropping or losing of the accessory can be prevented, however since heavy weight article accompanies a pain due to a load of earlobe being increased, its wearing is impossible, and in this regard, selectivity of the accessory becomes greatly narrower.

(b) Because it is directly stuck and penetrated through the earlobe, it accompanies of [cource] *course* physical as well as psychological [pains] *pain* and hence [there may be a case that can never be worn for some person] *some people may never be able to wear it.*

OBJECT AND SUMMARY OF THE INVENTION

The present invention is invented for solving the problems that conventional ear wearing accessories such as earring or piercing include, and it is an object of the present invention to provide an ear wearing accessory in which said ear wearing accessory is structured with "main body means to be worn at opening end portion of external ear, connecting means in which one end is fixed to said main body means while another end is clamped at approximately bottom end of the earlobe, and accessory means to be fixed at appropriate position of said connecting means", so that wearing is simple and having no worry for dropping and losing, and voluntariness of selecting the accessory can be remarkably increased because no pain is accompanied upon wearing even when the accessory means becomes rather bigger and the weight is increased.

According to the invention, since the main body means is inserted into the bottom of opening end of the external ear, and the connecting means to be fixed to said main body means is made to clamp the bottom part of the earlobe by its lower end portion, the accessory means to be worn to the connecting means is held by the bettom portion of opening end of the external ear through the main body means, and therefore the accessory means can be hung without any pain even if the weight of the accessory means is rather increased.

The forgoing and other objects as well as advantages of the present invention will become clear by following description of the invention with reference to the accompanying drawings.

BRIEF DESCRIPTION OF THE DRAWINGS

For a better understanding of the invention, and to show how the same may be carried out into effect, reference will now be made, by way of example, with respect to the accompanying drawings, in which:

FIGS. 1 (a), (b) are diagrams for showing first embodiment of the present invention, in which FIG. 4 is a side view for illustrating a state that accessory means are respectively fixed at appropriate positions of the connecting means so as respective accessory means are positioned at front side, rear side, and bottom side, FIGS. 5(a), (b) are diagrams for showing other embodiment of the present invention, in which FIG. 6 is a perspective view for showing third embodiment of the present invention, FIG. 7 is a fragmentary perspective view for showing another example of the tube member, FIG. 8 is a fragmentary perspective view for showing another example provided with a presser at front end of calmping portion, [and]

FIG. 9 is an exploded perspective view for showing structural state of still other embodiment according to the present invention[.].

FIG. 10 shows an accessory means (B) that can be a watch that informs of the time by sound[.].

Throughout the drawings, like reference numerals and symbols are used for designating like or equivalent parts or portions, for simplicity of illustration and explanation.

DETAILED DESCRIPTION OF THE PREFERRED EMBODIMENTS

Hereinafter, the preferred embodiments of the present invention will be described in detail with reference to the accompanying drawings as followings.

Figure 1A:
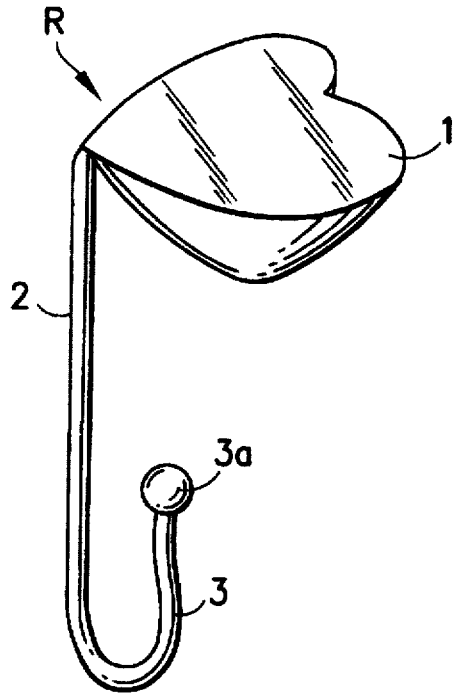
FIG. 1(a) is a perspective view for showing external appearance.

FIGS. 1(a), (b) and 2 are diagrams for showing a preferred embodiment of the present invention which is related to claims 1 and 2.

Figure 1B:
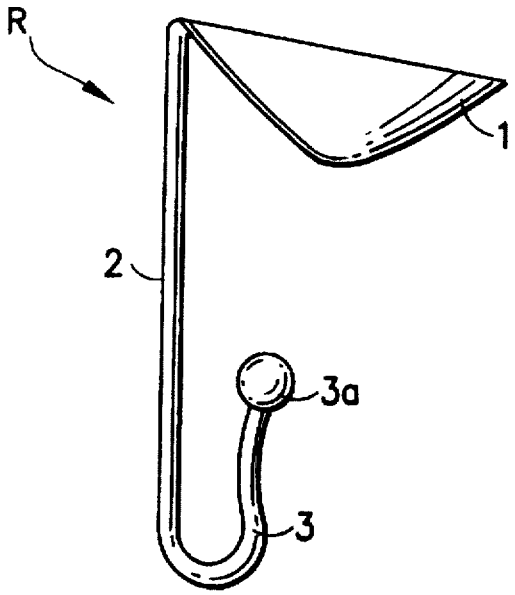
FIG. 1(b) is a side view thereof.

In FIG. 1 R is ear wearing accessory, reference numeral 1 is main body means, 2 is connecting means, and 3 is hook-like portion formed at lower end of said connecting means, and said ear wearing accessory R is structured with said main body means 1, connecting means 2, and various desired accessory means A to be mounted to any appropriate position of said hook-like portion 3.

Figure 2:
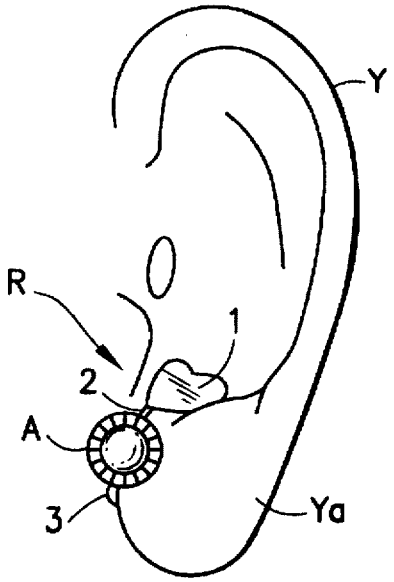
FIG. 2 is a perspective view for showing a wearing state of ear wearing accessory according to this invention.

The main body means 1 is formed with approximately heart shape in top surface so as to be able to insert into the opening end of *an* external ear of *a* human *being* as shown in FIG. 2, which is structured in such shape having a cross section of approximately heart pattern, and it is made of silicone rubber in this embodiment.

The connecting means 2 is made of metallic material having flexibility or other wire material, and to which lower end portion there is formed with hook-like portion 3 so as to be able to clamp the bottom end portion of *an* earlobe [of human].

This hook-like portion 3 is formed by bending back the end portion of the connecting means 2, but at this moment, it is desirable to make so as not to be parallel with major portion of the connecting means 2, that is, said bent back portion is to be crossed with the connecting means 2. Because when it is thus crossed, it may be frimly fitted to ear in a state of clamping the earlobe to thereby become possible to surely clamp.

Reference numeral symbol 3a is *an element* (*e.g.*, a small ball *as shown in FIG. 1(a)*) for pressing provided at terminating end portion of the hook-like portion 3. And, in FIG. 2, reference symbol Y represents *an* external ear [of human, ]. *Symbol* A represents accessory means appropriately mounted to the connecting means 2.

As shown in the drawings, the main body means 1 is inserted into the bottom of opening end of the external ear Y, and the hook-like portion 3 of the connecting means 2 clamps the lower end of the earlobe Ya, so that the ear wearing accessory R is firmly worn to the external ear Y.

Since the weight of the accessory means A is supported by the bottom of opening end of the external ear through the main body means 1 in said state, the weight is never concentrated at particular location of the external ear as conventional earing or piercing even if the weight of the accessory means A is increased, and also any pressing feeling or pain is never produced. And, since the weight for entire means is supported by the main body means elastically inserted into the bottom of opening end of the external ear and it is also made to fix to the earlobe by the hook-like portion in order to prevent any shaking, it is never released from ear by any considerable accident. Further, although it is described an example for making the main body means by silicone rubber in this embodiment, when the connecting means is covered by silicone rubber, dissimilative feeling upon wearing can be decreased and besides, when said silicone rubber is made in similar as skin color, the accessory means becomes to look better and thereby function for accessory becomes more raised.

Figure 3:
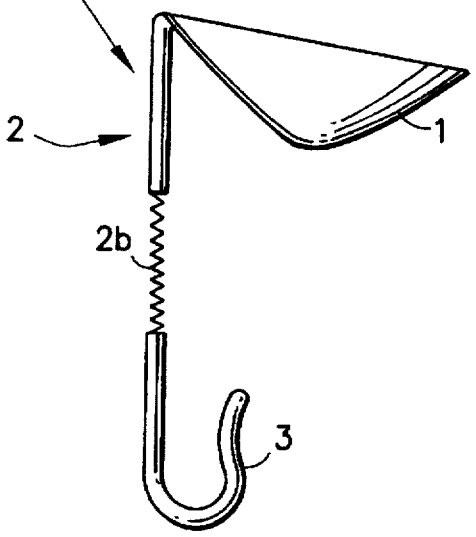
FIG. 3 is a side view for showing second embodiment of the present invention.

FIG. 3 is a diagram for showing another preferred embodiment of the present invention related to the claim 4. In this embodiment, coil spring 2b is provided at pertinent portion of the connecting means 2 and thereby flexibility of the connecting means 2 is improved. Thus, middle part of the connecting means 2 is formed by the coil spring 2b, so that the ear wearing accessory R [becomes] *adjusts* to fit with *the* ear of any person without dissimilative feeling.

Figure 4:
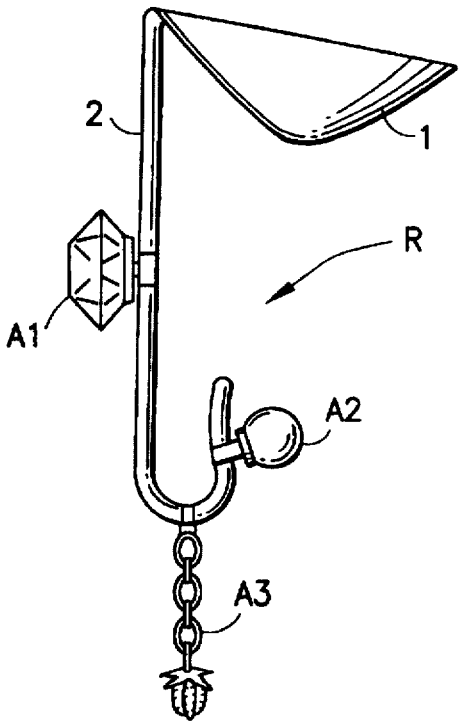

FIG. 4 is a diagram for illustrating the case mounted with various accessory means A1, A2, A3 to ear wearing accessory R related to this invention. Each accessory means are respectively mounted so as the accessory means A1, [to] *may* be positioned at *the* front side of *the* ear, the accessory means A2 [to] *may* be *positioned at the* rear side of *the* ear, and accessory means A3 [to] *may* be hung at the bottom end of *the* ear.

Thus, according to the ear wearing accessory related to this invention, entire ear can be simply made into total design.

Further, although the material of the connecting means 2 is not particularly defined in above-described embodiment, when it is made of precious metals such as gold or platinum and the like, the function as an accessory may further be raised. And, when the connecting means is made of so called pattern remembering alloy, wearing property to ear can be further improved.

Figure 5A:
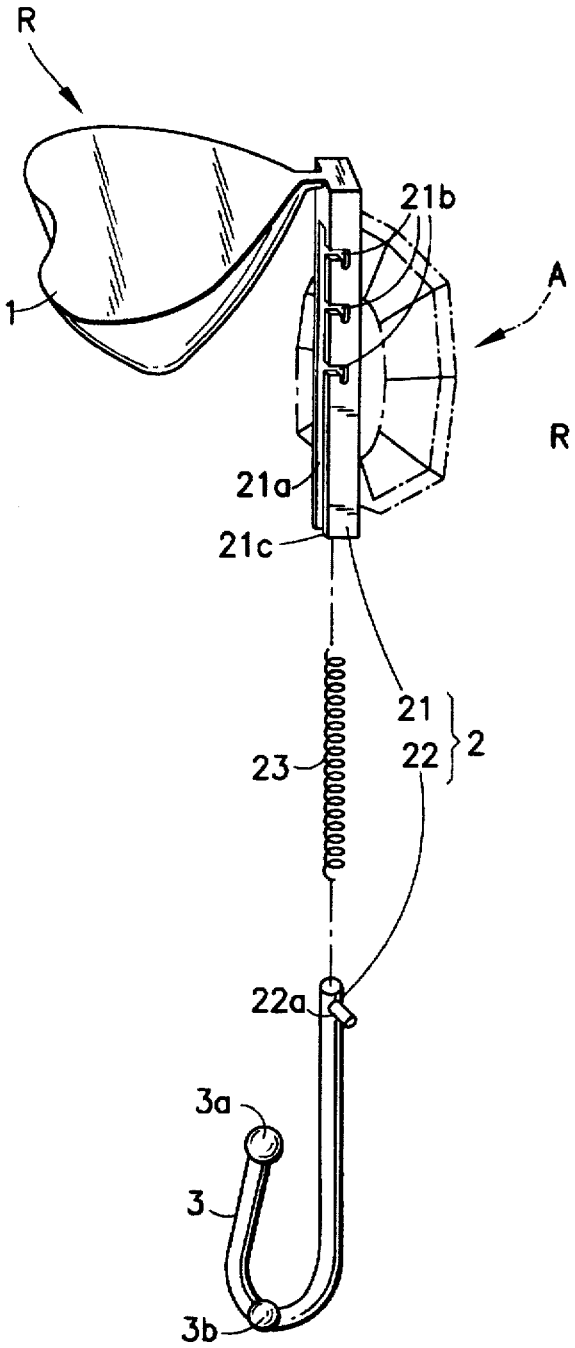
FIG. 5(a) is an exploded perspective view for showing tube member, inserting member and the like, FIG. 5(b) is a perspective view for showing entire external appearance.

And, FIGS. 5(a), (b) are diagrams for showing still other embodiment of the present invention related to the claim 5 of this application.

In this embodiment, the connecting means 2 is structured with tube member 21 and inserting member 22 to be inserted into this so as to be extended and contracted. [To said] *Said* tube member 21 [there are] *is* provided with *a* cut out slot 21a in *an* axial direction as a slot means and three holding holes 21b *in turn* communicating [to] *with* said slot are formed in up and down direction [in turn]. On the other hand, holding pin 22a is formed at front end of the inserting member. For inserting the inserting member 22 into the tube member 21, stopper 21c is released and the holding pin 22a is inserted into the cut out slot 21a and then the inserting member 22, is [slided] *slid* along the slot of the tube member 21. And, the inserting member 22 is rotated whereby the holding pin 22a is placed at the holding hole 21b of desired position and thereby adjusting [of] *the* position of the inserting member 22 relative to the tube member 21 is executed, in other [word] *words*, adjusting of length of the connecting means 2 is made possible, so that wearing degree to the ear can be adjusted.

Futhermore, the hook-like portions 3 is mounted to the connecting means 2, more particularly to the inserting member 22 so as to be able to freely open and close, so that wearing to the earlobe is made in easy.

Figure 5B:
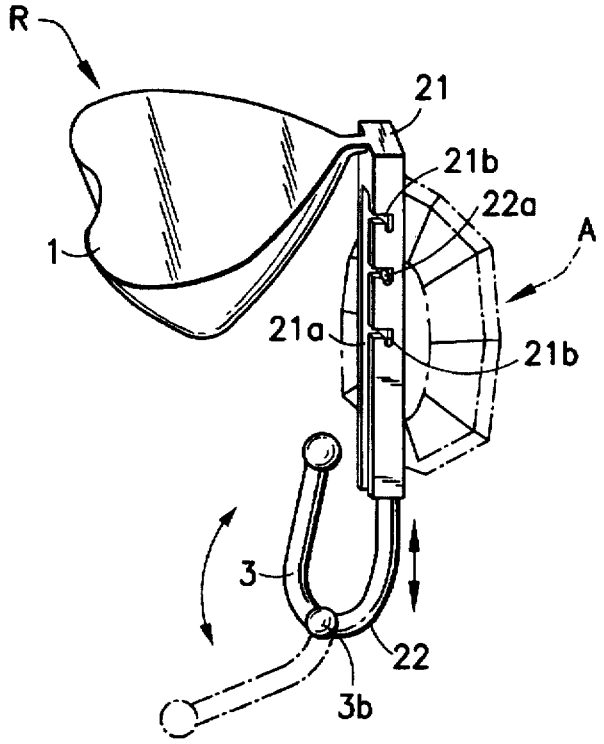

In addition, in the drawings, reference [numberal] symbol 3b is opening and closing mechanism of the hook-like portion 3, which is normally made to elastically fix the hook-like portion 3 to closed position, that is, solid line position shown in FIG. 5(b). And, reference numeral 23 in FIG. 5(a) is coil spring for elastically holding the inserting member 22 into the tube member 21. This spring is inserted within the tube member 21 and thereby it is made to either constantly press the inserting member to downward, or inversely to constantly urge to upward. The holding pin 22a of the inserting member 22 and the holding hole 21b of the tube member 21 are firmly coupled by said spring.

FIG. 6 is a diagram for showing further embodiment of the present invention [related to the claims 6 and 7].

In this embodiment, the connecting means 2 is structured with *the* tube member 21 and *the* inserting member 22 to be inserted into said tube member 21 so as to be freely extended or [constracted] *contracted.*

And, the inserting member 22 is formed with *a* slit 23 in its axial direction whereby *the* elastic coupling to the tube member 21 is made possible, and as a result of this, the inserting member 22 can be fixed at desired position of the tube member 21.

As shown in the drawing, lower end portion of the inserting member 22 is formed in *a* U-shape and clamping portion 24 is mounted through a spring mechanism to its end portion.

The clamping portion 24 becomes to press the rear side of earlobe by said spring mechanism toward the tube member 21 and thereby the ear wearing accessory R can be firmly fixed at a predetermined position of ear.

FIG. 7 is a diagram for showing another example of the inserting member 22. In this example, a pair of protrusions 25 are formed at *a* top end portion of the inserting member 22.

The inserting member 22 can be elestically coupled into the tube member 21 more easily by said protrusions 25.

FIG. 8 is a diagram for showing a case provided with a presser of heart shape at front end of the clamping portion 24, and pressing to the earlobe becomes easier by this.

FIG. 9 is a diagram for showing still further embodiment of the present invention related to the claim 8 of this application.

In the drawing, reference numeral 4 is upper holding means, and which [froms] *forms* approximately *a* heart shape in top surface in order to wear at *a* bottom of *an* opening end of the external ear, and its bottom surface is formed in a shape [to be] gradually reduced in diameter [by going along to] *in a* downward *direction.*

And, reference symbol M is magnet buried at bottom side surface portion of the upper holding means.

Further, reference numeral 22 is inserting member, and it is formed with a bar material of U-shape, and one side standing portion is to be inserted into the tube member 21 to thereby be made to be able to slide in up and down direction.

Reference numeral 7 is adjusting portion formed at another side standing portion of the inserting member 22, and said standing portion is made to be able to adjust to a predetermined angle.

And, reference numeral 6 is lower holding means, and it is fixed at top end of another standing portion of the inserting member 22, and in order to wear to the rear side surface of ear, its top surface is formed in concave and being formed in approximately heart shape as shown in the drawing.

To the top surface of said lower holding means 6, magnet M corresponding to aforementioned upper holding means 4 is buried.

And reference symbol A is accessory means mounted to the tube member 21.

This ear wearing accessory R is worn with upper holding means 4 at the bottom of opening end of the external ear, and *a* lower holding means 6 is worn so as to be positioned at rear side surface of each confronting to uper holding means 4.

Therefore, the ear wearing accessory R can be worn readily and appropriately at ear portion without feeling any dissimilative feeling such as strong tightening according to the mutual attracting force of each magnets M, M of respective holding means 4, 6.

And, magnetic force which serves to wear said ear wearing accessory R is of course harmless for human body as well known, but it brings good operation for hemoglobin within blood, and it is possible to reduce loading feeling which is felt from self weight of the ear wearing accessory R.

Further, although the wearing accessory is described on the assumption of usual jewel or the like in aforementioned respective embodiments, watch informing the time by sound instead of such accessory means or together with accessory means may be mounted.

That is, when a watch having a mechanism outputting the time informing sound recorded to *an* IC in response to the signal from watch is mounted, it becomes possible to know the time directly at ear voluntarily.

Since the present invention comprises above-described contruction and operation, following effects can be obtained.

(a) Stress feeling and painful feeling are not present even if wearing for long time period.

(b) since it is not easily released, there is no worry of dropping or losing and it is not necessary to pay excessive care even when wearing expensive jewelry and the like.

(c) Wearing is simple.

(d) Since the accessory means can be attached not only to front side of ear but rear side as well as bottom side, free range of design as accessory becomes greatly bigger.

It will be appreciated that the present invention is not restricted to the particular embodiment that has been described hereinbefore, and that variations and modifications may be made therein without departing from the spirit and scope of the invention as defined in the appended claims and equivalents thereof.

I claim:

1. An earring comprising:

a tube member having a top end fixed to an upper holding means and extending downwardly;

an inserting member which is formed with a U-shaped bar member including a first vertical section adapted to be inserted into said tube member so as to be able to slide in an up and down direction and further including adjusting means capable of adjusting the angle of a second vertical section of said inserting [means] *member*;

lower holding means fixed at a top end of the second vertical section, said lower holding means having a concave surface on the top surface thereof and to be worn on a rear side of a human ear and forming approximately a heart shape, and being provided with a magnet; and accessory means mounted at said tube member.

2. An earring according to claim 1, wherein said accessory means is a watch informing of the time by sound.

3. An earring comprising:

a main body means adapted to be inserted into [the] *an* external opening of a human ear;

connecting means for affixing an ornamental accessory to an earring; said connecting means being attached at an upper end to the main body means;

a hook-like element attached to a lower end of said connecting means and adapted to be releasably clamped to [the] *a* rear side of a human earlobe; and [accessory] means for mounting *an accessory* at an appropriate position on the connecting means;

wherein the connecting means comprises a tube member and an insert member to be inserted into the tube member so that the length of the connecting means can be freely adjusted, the tube member including a slot extending longitudinally therein and further including a plurality of holes in communication with the longitudinally extending slot for receiving a holding pin mounted on the inserting member, said pin adapted to be slidably inserted into the longitudinally extending slot and inserted into one of the holding holes upon determining the desired length of the connecting means.

4. An earring comprising:

a main body means adapted to be inserted into [the] *an* external opening of a human ear;

connecting means for affixing an ornamental accessory to an earring, said connecting means being attached to an upper end to the main body means;

a hook-like element attached to a lower end of said connecting means and adapted to be releasably clamped to [the] *a* rear side of a human earlobe; and accessory means for mounting at an appropriate position on the connecting means;

wherein the connecting means comprises a tube member and an insert member to be inserted into the tube member so that the length of the connecting means can be freely adjusted, and wherein the insert member is formed at one end with an axially extending slit for enabling an elastic coupling to the tube member and the hook-like element is attached to the other end of the insert member of the connecting means.

5. An earring according to claim 4, wherein the end of the insert member that is attached to the hook-like element is U-shaped and said hook-like element is mounted to the U-shaped insert member with a spring mechanism.

*6. An earring comprising:*

*a main body for insertion into an external opening of a human ear;*

*a hook-like element including a clamping portion for releasably engaging a rear side of an earlobe of the human ear; and*

*a connector having said main body extending from a first position thereof and said hook-like element extending from a second position thereof;*

*wherein said hook-like element extends from said connector in a direction that is not parallel with said connector and which is crossed with the connector to firmly fit said human ear when clamping said earlobe.*

*7. The earring of claim 6, wherein said main body is generally heart-shaped and has a generally convex bottom surface for engaging a bottom portion of an external opening of a human ear.*

*8. The earring of claim 7 wherein:*

*said main body includes a pair of wing portions connected together at opposing ends, said opposing ends including a first end having a generally convex shape and a second end having a generally concave shape; and*

*said connector is attached to said first end.*

*9. The earring of claim 7 wherein:*

*said main body includes a pair of wing portions connected together at opposing ends, said opposing ends including a first end having a generally convex shape and a second end having a generally concave shape; and*

*said connector is attached to said second end.*

*10. The earring of claim 6 wherein said connector comprises a decorative accessory.*

*11. The earring of claim 6 wherein said hook-like element is crossed with said connector such that said clamping portion does not directly face said connector in a clamping position.*

*12. A clasp assembly for an earring comprising:*

*a main body for insertion into an external opening of a human ear;*

*a hook-like element including a clamping portion for releasably engaging a rear side of an earlobe of the human ear; and*

*a connector having:*

*said main body extending from a first end thereof,*

*said hook-like element extending from a second end thereof, and*

*means for mounting a decorative accessory thereto;*

*wherein said hook-like element extends from said connector in a direction that is not parallel with said connector and which is crossed with the connector to firmly fit said human ear when clamping said earlobe.*

*13. The clasp assembly of claim 12, wherein said main body is generally heart-shaped and has a generally convex bottom surface for engaging a bottom portion of an external opening of a human ear.*

*14. The clasp assembly of claim 13 wherein:*

*said main body includes a pair of wing portions connected together at opposing ends, said opposing ends including a first end having a generally convex shape and a second end having a generally concave shape; and*

*the first end of said connector is attached to the first end of said pair of wing portions.*

*15. The clasp assembly of claim 13 wherein:*

*said main body includes a pair of wing portions connected together at opposing ends, said opposing ends including a first end having a generally convex shape and a second end having a generally concave shape; and*

*the first end of said connector is attached to the second end of said pair of wing portions.*

* * * * *